US006711985B1

(12) United States Patent
Doyle

(10) Patent No.: US 6,711,985 B1
(45) Date of Patent: Mar. 30, 2004

(54) SEALED GLIDE ADAPTER

(75) Inventor: James E. Doyle, Grandville, MI (US)

(73) Assignee: Suspa Incorporated, Grand Rapids, MI (US)

( * ) Notice: Subject to any disclaimer, the term of this patent is extended or adjusted under 35 U.S.C. 154(b) by 0 days.

(21) Appl. No.: 10/293,848

(22) Filed: Nov. 13, 2002

(51) Int. Cl.[7] .......................... F16J 15/18
(52) U.S. Cl. .................. 92/117 A; 248/188.5; 92/165 R
(58) Field of Search .................. 92/117 A, 117 R, 92/165 R, 168; 16/19, 32; 248/188.5, 622, 631

(56) References Cited

U.S. PATENT DOCUMENTS

| | | | | |
|---|---|---|---|---|
| 3,150,853 A | * | 9/1964 | Lisbin | 248/188.4 |
| 5,553,550 A | | 9/1996 | Doyle | 248/188.5 |
| 5,620,067 A | | 4/1997 | Bauer et al. | |
| 5,787,792 A | * | 8/1998 | Illgner | 92/117 A |
| 5,915,674 A | | 6/1999 | Wolf et al. | |
| 6,352,037 B1 | | 3/2002 | Doyle | |
| 6,360,675 B1 | | 3/2002 | Jones | |

OTHER PUBLICATIONS

Exhibitis A and B are photographs of existing glide adapters.

* cited by examiner

*Primary Examiner*—Thomas E. Lazo
(74) *Attorney, Agent, or Firm*—Price, Heneveld, Cooper, DeWitt & Litton

(57) ABSTRACT

A glide adapter for a lift includes an inner seal extending between the piston rod and glide adapter to prevent leakage of hydraulic fluid which may escape the hydraulic cylinder from seeping from the lift. The sealed glide adapter comprises a generally cylindrical member having an axially extended threaded section for receiving a threaded glide at one end and a cylindrical recess formed at an opposite end, including an undercut recess for snap-receiving a resilient polymeric cylindrical seal which includes an annular groove for receiving an O-ring extending between the outer surface of the seal and the inner cylindrical surface of the glide adapter. The seal includes a blind aperture for receiving one end of the piston rod of the hydraulic cylinder. This design also facilitates servicing of the unit by allowing removal and replacement of the hydraulic cylinder.

21 Claims, 3 Drawing Sheets

SEALED GLIDE ADAPTER

BACKGROUND OF THE INVENTION

The present invention relates to a hydraulic lift system for use in connection with adjustable work surfaces and particularly to an improvement to the support tube for preventing leakage of hydraulic fluid.

As the work place environment changes with technology, so too do the facilities employed by companies to provide ergonomically appropriate work stations for technical, clerical, and assembly personnel. To accommodate different job tasks, frequently it is desirable to have a work surface or table which is vertically adjustable, such that the work surface can be employed by individuals of different stature and individuals in a standing position, a sitting position on a chair, or in an intermediate position when using, for example, a stool-height seat.

There exists numerous adjustable table assemblies which are either mechanically controlled by screw jack mechanisms or which are electrically controlled screw jacks. Some installations employ hydraulic cylinders with a pump for pressurizing fluid from a master cylinder to slave cylinders mounted within hydraulic lifts secured to the legs of a table for controlling the vertical adjustment of the work surface. One such system is commercially sold by Suspa Incorporated under the trademark MOVOTEC®, which includes a hydraulic support tube assembly for each table leg, with each support tube assembly including an outer housing, a support tube extendable from the housing and an inner hydraulic cylinder which is coupled between the outer housing and support tube and includes a piston rod which extends and retracts for raising and lowering the support tube for extending and retracting the support tube from the housing. The support tube includes a threaded glide at its lower end which extends through a glide adapter providing an interface between the support tube and the threaded adjustable glide which is in the form of an adjustable foot which contacts the support surface for the table. In such systems, the glide adapter includes an annular outer seal extending between the inner surface of the support tube and the glide adapter to provide a sealed interface. The adjustable glide is threaded along its entire axial length to provide a maximum adjustment of the lift cylinder assembly for leveling of the table on uneven support surfaces. The piston rod from the hydraulic cylinder is typically pinned to the glide adapter, which is lockably held to the support tube by crimping. It has been discovered that with several years and thousands of cycles of use, the inner hydraulic cylinder tends to leak fluid slightly, which fluid, when exiting the hydraulic cylinder, enters the support tube area and accumulates at the lower end near the junction of the piston rod and glide adapter. With the threaded throughhole for receiving the adjustable glide, the fluid will, over a period of time, seep from the bottom of the lift, spilling over the glide and contacting the floor surface on which the table is supported. This typically only happens after several years of use, however, the result can be a hydraulic fluid stained carpet, floor, or other surface.

Thus, there exists a need to overcome this problem to prevent hydraulic fluid leakage from a hydraulic lift after years of use such that staining of the floor surface is prevented. Also, there exists a need for an improved lift cylinder which solves the leakage problem and allows the hydraulic cylinder to be removed for repair if necessary.

SUMMARY OF THE INVENTION

The system of the present invention solves this problem by providing a unique glide adapter which is relatively inexpensive and which includes a seal extending between the piston rod and glide adapter to prevent hydraulic fluid which may escape the hydraulic cylinder from seeping from the lift itself. In a preferred embodiment of the invention, the sealed glide adapter comprises a generally cylindrical member having an axially extending threaded aperture formed through one end for receiving a threaded adjustable glide. A cylindrical recess is formed in the glide adapter at an opposite end and includes an undercut recess for snap-receiving a resilient polymeric cylindrical seal which includes an annular groove for receiving an O-ring extending between the outer surface of the seal and the inner cylindrical surface of the glide adapter. The seal includes a blind aperture for receiving one end of the piston rod of the hydraulic cylinder.

With such construction, therefore, the glide adapter is sealed both on its outer periphery to the cylindrical support tube and on its inner periphery against the interior of the seal such that leakage of hydraulic fluid from the lift is prevented. These and other features, objects and advantages of the present invention will become apparent upon reading the following description thereof together with reference to the accompanying drawings.

DETAILED DESCRIPTION OF THE PREFERRED EMBODIMENT

Figure 1A:
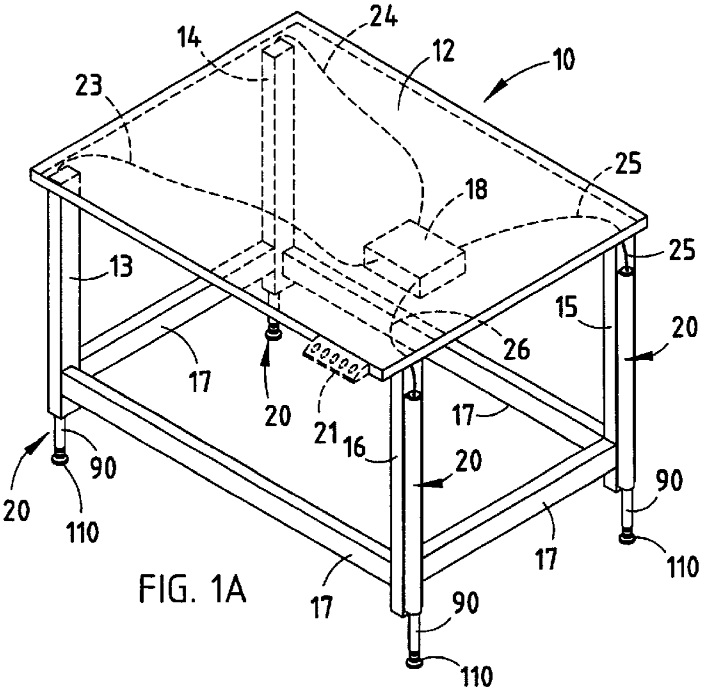
FIG. 1A is a perspective view of a work surface shown in a lowered position and including a support tube embodying the present invention attached to each of its legs.
Figure 1B:
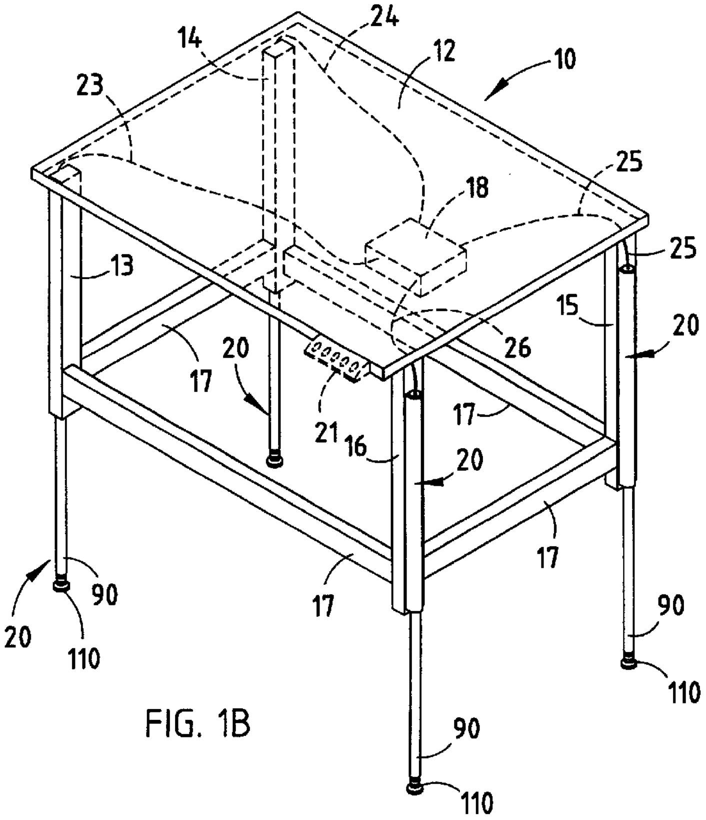
FIG. 1B is a perspective view of the work surface shown in FIG. 1A, shown in an elevated position.
Figure 2:
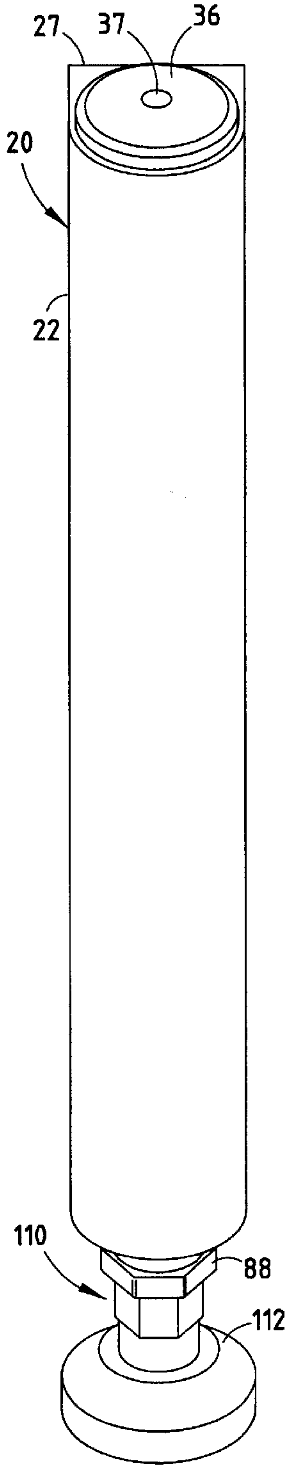
FIG. 2 is a perspective view of one of the lifts of the present invention.

Referring initially to FIGS. 1A and 1B, there is shown a table 10 having a horizontally extending work surface 12 supported by four downwardly depending legs 13–16, which are stabilized by cross members 17 coupled to the legs near the lower ends thereof. Secured to each of the legs is a hydraulic lift 20 embodying the present invention. Lifts 20 are secured to the legs by conventional fasteners extending through the legs 13–16 and threaded into flat side 27 of the housing 22 (FIG. 2) of each of the lifts 20. The table 10 includes a hydraulic pump unit 18 mounted to the undersurface thereof from which extends hydraulic lines 23–26 into each of the lifts 20 associated with the four table legs 13–16. Unit 18 can include a hand crank for manual operation or, in the preferred embodiment, includes an electrically actuated pump controlled by switches on a control panel 21. Panel 21 is mounted on the forward edge of the undersurface of work surface 12 and includes controls for selectively controlling unit 18 for raising and lowering the work surface 12 as illustrated in FIGS. 1A and 1B or to any desired intermediate position and can be preprogrammed for multiple settings.

Each of the lifts 20 are identical so only one such lift is now described in connection with FIGS. 3–5. Lifts 20 incorporate a few structural elements, the understanding of which will become apparent upon a description of the details of the lift construction, however, a brief description of the overall system is first presented. As best seen in FIG. 4, each lift 20 includes a connecting head 30 which is lockably secured to the upper end of housing 22. Connecting head 30 is sealably coupled to the upper end of a hydraulic cylinder 40 having a piston 50 which is in sealed communication with a fluid channel 35 in connecting head 30. Thus, hydraulic fluid pressure applied through a suitable hydraulic connection to one of the lines 23–26 shown in FIG. 1 applies pressure to a piston 50, which is coupled by piston rod 60 to the sealed glide adapter assembly 70 which, in turn, is lockably coupled to the support tube 90. Support tube 90 is slidably positioned and supported within housing 22, in part, by a support tube sleeve bushing 100. A threaded adjustable glide 110 is inserted into a glide adapter 80 included in assembly 70 such that, as fluid pressure is applied to the upper end of piston 50, piston rod 60 extends and retracts from the cylinder 40 extending and retracting the support tube 90 from the lift, as seen in FIGS. 1A and 1B.

As will become apparent from the following description, the annular space 120 (FIG. 4) between the piston rod 60 external to hydraulic cylinder 40 and the inner surface 92 of support tube 90 is sealed at its lower end such that any loss of hydraulic fluid from cylinder 40 over a period of use will not be capable of seeping through the lower end of lift 20 due to the unique design of the sealed glide assembly 70. Having briefly described the overall components of the lift 20, a detailed description now follows in conjunction with FIGS. 3–5.

Figure 3:
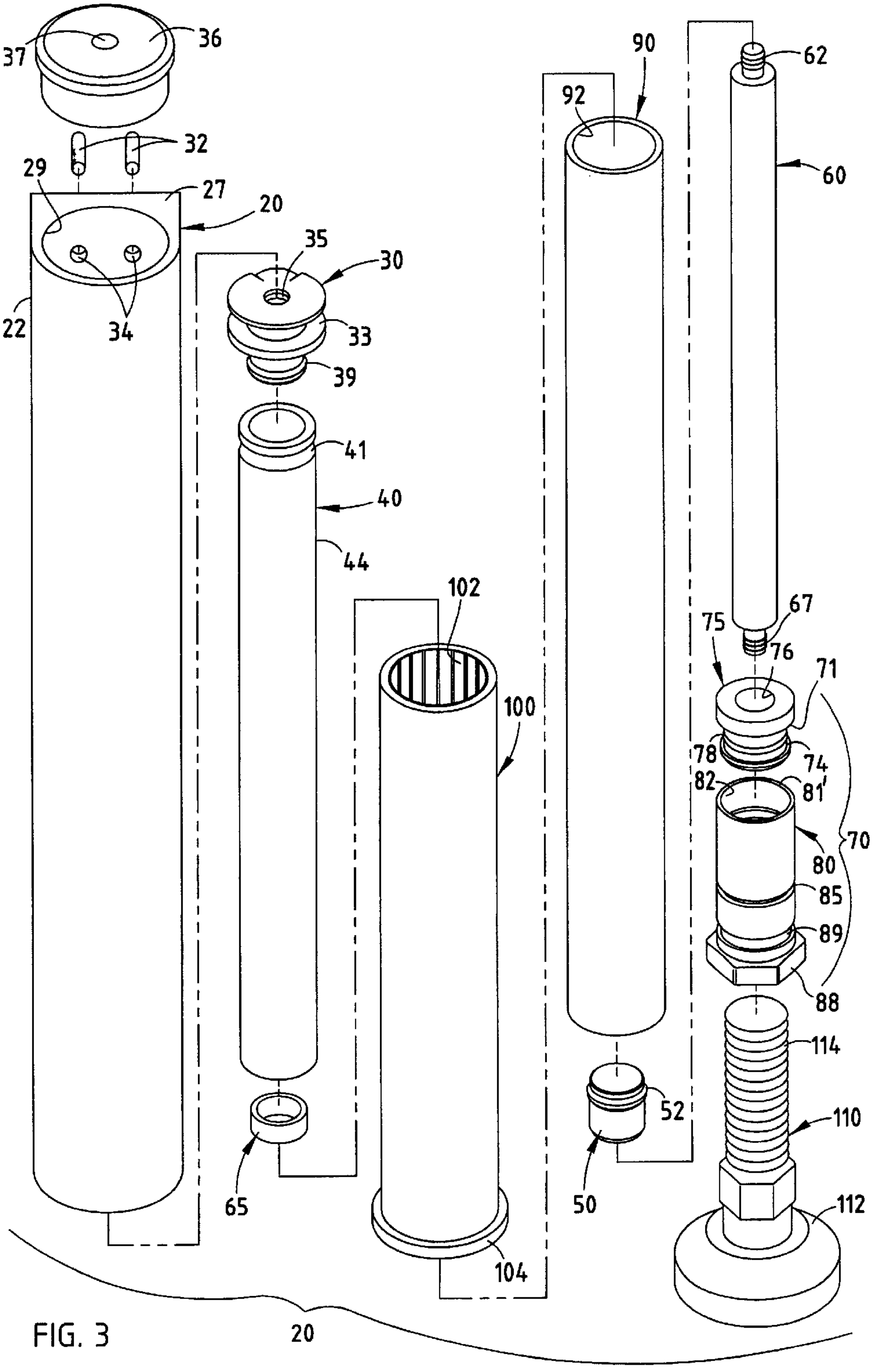
FIG. 3 is an exploded perspective view of the components of the lift shown in FIGS. 1 and 2.
Figure 4:
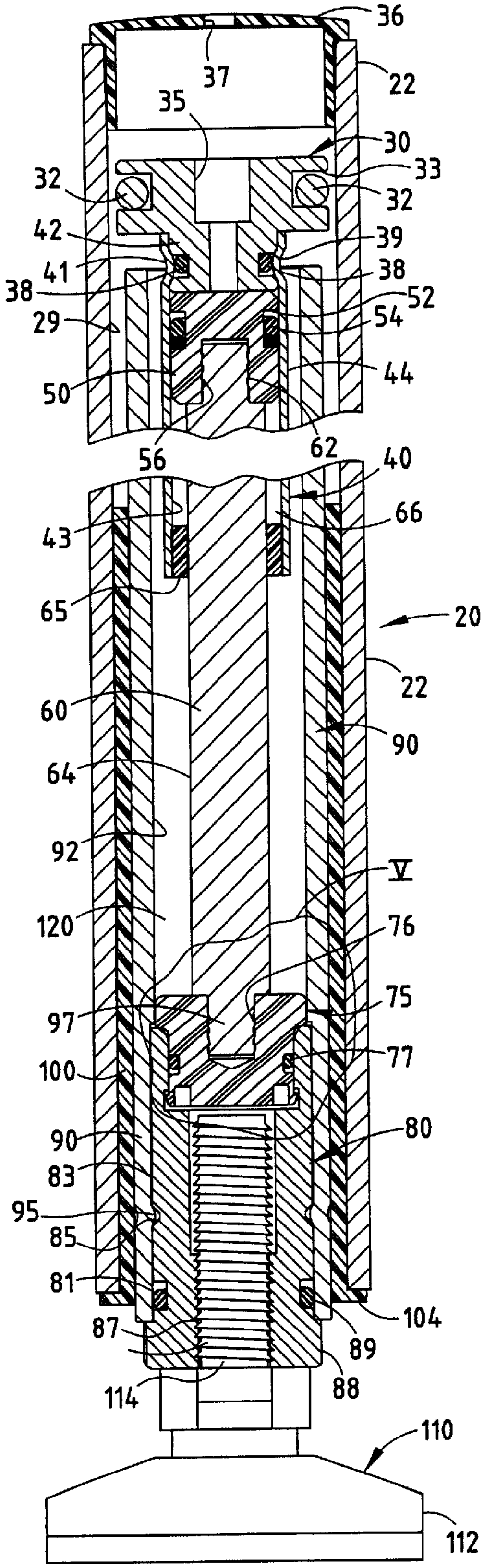
FIG. 4 is a vertical cross-sectional view of the lift shown in FIGS. 1–3, partly broken away.
Figure 5:
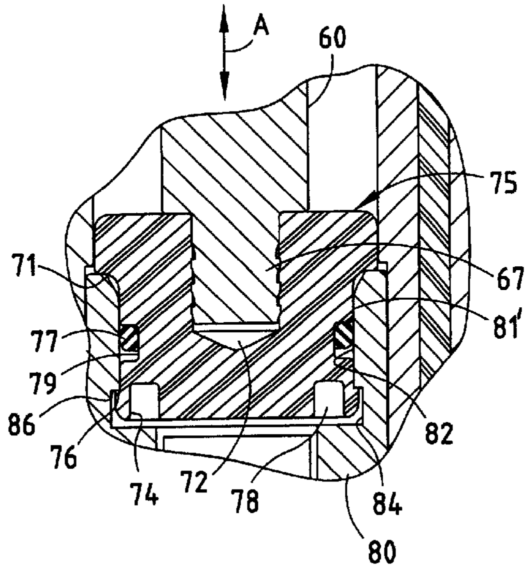
FIG. 5 is an enlarged cross-sectional view of the area V shown in FIG. 4.

As seen in FIGS. 3 and 4, the housing 22 for lift 20 includes a generally cylindrical, longitudinally extending opening 29 extending along its length for receiving the components of the lift including the hydraulic cylinder 40, support tube sleeve bushing 100, support tube 90, piston rod 60, and the sealed glide adapter assembly 70. The exterior of housing 22 includes at least one flat surface 27 (FIGS. 2 and 3), which is positioned against one of the flat table legs 13–16 and which includes threaded apertures (not shown) for receiving threaded fasteners extending through the table legs and securing a housing 22 to each of the table legs as seen in FIGS. 1A and 1B. The lift 20 includes a connecting head 30 which is secured to housing 22 by means of an annular groove 33 formed in the connecting head and which is held against axial movement by a pair of locking pins 32 extending through apertures 34 in housing 22 (FIG. 3). The connecting head 30 includes a central threaded, axially extending aperture 35 for receiving a fitting sealably coupling one of the hydraulic lines 23–26 which extends through aperture 37 in a closure cap 36 snap-fitted to the open upper end of housing 22.

The connecting head 30 is sealably coupled to the inner cylindrical wall of the elongated hydraulic cylinder 40 by means of an O-ring 38 (FIG. 4) positioned in an annular groove 39. The metallic cylindrical wall 44 of hydraulic cylinder 40 is crimped around its periphery at 41 to seal the upper end of cylinder 40 to the reduced diameter downwardly depending cylindrical end 42 of connecting head 30, which thereby sealably extends into the top of cylinder 40. Sealably coupled to the inner cylindrical surface 43 of cylinder 40 is a hydraulic piston 50 comprising a polymeric member which has a piston head 52 in fluid communication with the passageway 35 through connecting head 30 to receive the pressurized hydraulic fluid applied thereto. Piston 50 includes an annular groove 52 which holds an O-ring seal 54 for sealing the piston to inner wall 43 of hydraulic cylinder 40. An axial aperture 56 extends upwardly from the lower end of piston 50 and receives, in a force-fitting manner, the serrated upper end 62 of the piston rod 60 which is force-fit within aperture 56 to hold the end 62 of piston rod 60 to the piston 50. The lower end of the hydraulic cylinder 40 engages the outer cylindrical surface 64 of piston rod 60 by means of a bushing 65 which allows the piston rod to extend and retract from cylinder 40 for extending and retracting the support tube 90 as described below.

Over a period of years of use, the piston seal 54 will allow some leakage of hydraulic fluid into the annular space 66 between piston rod and inner surface 43 of cylinder 40 which can seep through the sliding bushing 65 and into the annular space 120 between the piston rod 60, cylinder 40, and inner wall 92 of support tube 90. Leaked hydraulic fluid, under the force of gravity, flows to the lower end of lift 20. The sealed glide assembly 70 of the present invention prevents leakage of such fluid from the lower end of the lift.

The glide adapter assembly 70 includes a seal 75, which can be generally cup-shaped (FIG. 5), and a glide adapter 80, with the seal 75 being made of a polymeric material and generally cylindrical, having a central axially downwardly depending blind aperture 72 which receives in force-fitting fashion the lower serrated end 67 of piston rod 60. Seal or cap 75 is sealably and lockably secured to an inner cylindrical surface 82 in glide adapter 80, as best seen in FIG. 5, by means of an outwardly projecting annular tang 74 of seal 75 having a latching shoulder 76 which engages undercut recess 84 in glide adapter 80. Thus, edge 76 of tabs 74 engage the horizontally extending annular surface 86 formed by undercut recess 84 to lockably hold the cylindrical seal 75 to the glide adapter 80 against movement in a longitudinal direction (indicated by arrow A in FIG. 5). To allow the flexing of tabs 74, an annular recess 78 is formed upwardly in the integrally machined seal 75 radially inside tabs 74. Seal 75 further includes a peripheral annular recess 79 for receiving a sealing O-ring 77 which seals against the inner cylindrical surface 82 of adapter 80. Thus, the seal 75 provides a physical coupling of piston rod 60 to glide adapter 80 and a sealed interconnection between glide adapter 80 and the space 120 between support tube 90 and hydraulic cylinder 40. The seal 75 includes an annular shoulder 71 (FIG. 5) which engages the upper annular rim 81' of glide adapter 80 to transmit the downward force applied by the piston rod on seal 75 to support tube 90 through glide adapter 80.

The glide adapter 80 is a machined generally cylindrical steel member and includes a central threaded aperture 87 extending therethrough (FIG. 4) having a hex-shaped lower end 88 for allowing adjustment of glide 110 as described below. Glide adapter 88 further includes an annular recess 89 which receives a sealing O-ring 81 therein for sealing the outer cylindrical surface 83 of glide adapter 80 to the inner cylindrical surface 92 of support tube 90. Support tube 90 is secured to the glide adapter 80 by means of an annular groove 85 extending around the periphery of glide adapter 80 and which receives a crimp 95 in the cylindrical wall of support tube 90. Thus, the lower end of support tube 90 is mechanically and sealably coupled to glide adapter 80.

The glide 110 includes a foot 112 and an upwardly extending threaded end 114 which is adjustably threaded into threaded aperture 87 of glide adapter 80. Glide 110 includes a hex surface 111 which, together with hex surface 88 on glide adapter 80, allows wrenches to adjust the glide for leveling the table on uneven surfaces and to provide a finite amount of final height adjustment if desired. The support tube 90 is guidably held within the cylindrical aperture 29 of housing 22 by means of a cylindrical guide bushing 100 having a longitudinally serrated inner surface 102, as best seen in FIG. 3, and an enlarged annular shoulder 104 which overlies, as best seen in FIG. 4, the lower end of housing 22. As seen in FIG. 4, the axial height of threaded section 114 of glide 110 is selected to prevent the glide from engaging seal 75.

In operation, as pressure is applied to the piston 50, rod 60 extends from cylinder 40, pushing downwardly against the connecting cap 30 locked to the housing 22 thereby pushing against seal 75 and glide adapter 80 which is coupled to support tube 90, thereby extending support tube 90 through bushing 100 outwardly from housing 22, raising the work surface 12, as illustrated in FIG. 1B. Upon release of the hydraulic pressure in cylinder 40, the support tube 90 can again retract within housing 22 as piston 60 retracts within cylinder 40. By providing the sealed glide assembly 70 of the present invention, any fluid which may leak from cylinder 40 into annular space 120 of the lift 20 is captured and prevented from escaping the lower end of the lift by means of O-ring seals 77 and 81 (FIGS. 4 and 5).

If it becomes necessary to replace hydraulic lift cylinder 40, cap 36 is removed from housing 22, as are locking pins 32. Glide 110 is then removed from glide adapter 80 and a tool, such as a rod, is inserted through aperture 87 to press the cap seal 75 and attached hydraulic cylinder 40 out through the open upper end of housing 22. A new cylinder and seal can then be installed.

In a preferred embodiment of the invention, the seal 75 is screw machined from a polymeric material made of, for example, acetal, polybutylene teraphthalate, or other suitable material. The glide adapter 80 is machined of metal, such as steel, and support tube 90 can also be made of metal, such as polished aluminum, stainless steel, or the like to provide an aesthetically acceptable external wall surface appearance when extended from the housing 22 as seen in FIG. 1B. Support tube sleeve bushing 100 is also made of a lubricious polymeric material, as are piston 50 and foot 112. The remaining components typically are machined aluminum or other suitable metal for providing the desired strength and rigidity to the lift 20 so formed. The locking tab 76 on seal 75 is a continuous annular member. In some embodiments it may be desirable to provide serrations to define a plurality of arcuately spaced locking tabs.

It will become apparent to those skilled in the art that various modifications to the preferred embodiment of the invention as described herein can be made without departing from the spirit or scope of the invention as defined by the appended claims.

The invention claimed is:

1. A sealed glide adapter assembly for a hydraulic lift comprising:

a generally cylindrical glide adapter having an axially extending threaded aperture for threadably receiving an adjustable glide therein, said glide adapter including a cylindrical aperture formed in one end thereof opposite said threaded aperture, said cylindrical aperture including an undercut recess for lockably receiving a seal; and a generally cylindrical seal including an annular resilient outwardly extending tab for snap-fitting said seal into said cylindrical aperture with said tab extending into said undercut recess thereof, wherein said seal includes an annular peripheral recess for receiving a sealing O-ring extending between the outer surface of said cylindrical seal and said glide adapter.

2. The assembly as defined in claim 1 wherein the seal includes an annular shoulder engaging an annular edge of said glide adapter for transmitting a force between said seal and said glide adapter.

3. The assembly as defined in claim 2 wherein said seal includes a central axially extending blind aperture for receiving an end of a piston rod.

4. The assembly as defined in claim 3 wherein said seal includes an annular aperture extending upwardly from an end opposite said blind aperture and spaced inwardly from said tab to allow said tab to resiliently deflect for snap-fitting said seal into said glide adapter.

5. The assembly as defined in claim 4 wherein said glide adapter includes a first annular recess for allowing said glide adapter to be crimp coupled to an overlying cylindrical support tube.

6. The assembly as defined in claim 5 wherein said glide adapter includes a second annular recess spaced axially from said first annular recess for receiving an O-ring and an O-ring therein for sealably coupling an outer cylindrical surface of said glide adapter to an inner cylindrical surface of a support tube.

7. The assembly as defined in claim 6 further including a generally cylindrical support tube secured to said glide adapter by crimping into said first annular recess.

8. The assembly as defined in claim 1 and including a glide having a threaded end threadably extending into said glide adapter.

9. A hydraulic lift comprising:

a housing;

a connecting head secured to one end of said housing;

a hydraulic cylinder sealably coupled to said connecting head and including a piston and piston rod therein, wherein said piston rod extends and retracts from said cylinder from an end of said hydraulic cylinder opposite said connecting head;

a support tube slidably mounted in said housing;

a generally cylindrical glide adapter having a first annular recess with an O-ring sealably coupling said glide adapter to a lower end of said support tube, said glide adapter further including a mechanical connection to said support tube, said glide adapter further including a cylindrical aperture formed in an upper end thereof, said cylindrical aperture including an undercut recess for receiving a seal; and a seal including an annular shoulder extending over said upper end of said glide adapter and an annular resilient outwardly extending tab spaced axially from said shoulder for snap-fitting said seal into said cylindrical aperture with said tab extending into said undercut recess, wherein said seal includes an annular recess for receiving an O-ring extending between an outer surface of said cylindrical seal and the cylindrical aperture of said glide adapter.

10. The lift as defined in claim 9 wherein said seal includes a central annular blind aperture for receiving an end of said piston rod.

11. The lift as defined in claim 10 wherein said glide adapter includes a threaded aperture extending axially into a lower end thereof.

12. The lift as defined in claim 11 and further including a glide threadably mounted within said threaded aperture of said glide adapter.

13. The lift as defined in claim 12 wherein said support tube is secured to said glide adapter by crimping.

14. A sealed glide adapter assembly for a hydraulic lift comprising:

a generally cylindrical glide adapter including a cylindrical aperture formed in one end thereof to define an annular rim, said cylindrical aperture including an undercut recess for receiving a seal; and a seal including an annular shoulder resting on said rim and a resilient outwardly extending tab axially spaced from said shoulder for snap-fitting into said undercut recess, said seal including an annular recess between said shoulder and said tab for receiving an O-ring sealably extending between said seal and said glide adapter.

15. The assembly as defined in claim 14 wherein said glide adapter has an axially extending threaded aperture for threadably receiving an adjustable glide therein.

16. The assembly as defined in claim 15 and including a glide having a threaded end threadably extending into said glide adapter.

17. The assembly as defined in claim 16 wherein said seal includes a central axially extending blind aperture for receiving an end of a piston rod.

18. The assembly as defined in claim 17 wherein said seal includes an annular aperture extending upwardly from an end opposite said blind aperture and spaced inwardly from said tab to allow said tab to resiliently deflect for snap-fitting said seal into said glide adapter.

19. The assembly as defined in claim 18 wherein said glide adapter includes a first annular recess for allowing said glide adapter to be crimped within an overlying cylindrical support tube.

20. The assembly as defined in claim 19 wherein said glide adapter includes a second annular recess spaced axially from said first annular recess for receiving an O-ring for sealably engaging the outer cylindrical surface of said glide adapter to an inner cylindrical surface of a support tube.

21. The assembly as defined in claim 20 further including a generally cylindrical support tube secured to said glide adapter by crimping into said first annular recess.

* * * * *